Oct. 19, 1926.
S. S. BALDWIN
1,603,933
BEARING HOLDER
Filed May 24, 1926
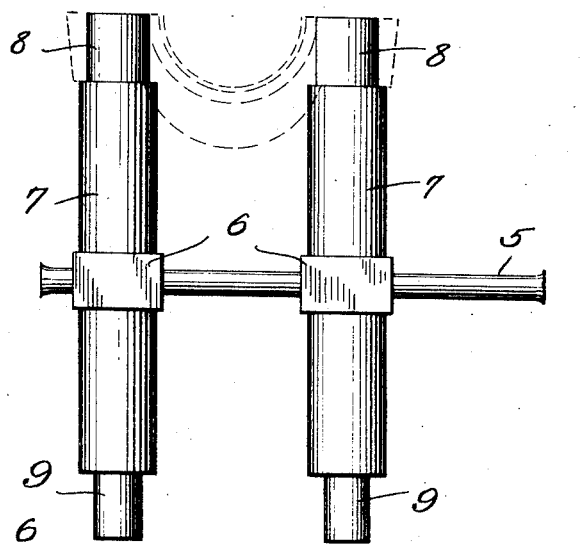
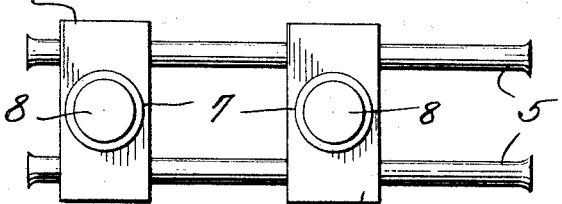
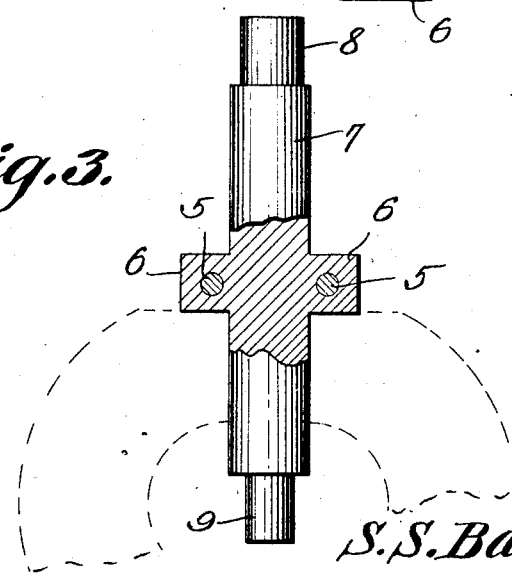
S. S. Baldwin
Inventor,
By C. A. Snow & Co.
Attorneys Patented Oct. 19, 1926.

1,603,933

UNITED STATES PATENT OFFICE.

SIMEON S. BALDWIN, OF KEWANEE, ILLINOIS.

BEARING HOLDER.

Application filed May 24, 1926. Serial No. 111,343.

This invention relates to a tool especially designed for use in supporting crank shaft, connecting rod bearings or the like while they are being repaired or otherwise conditioned for use.

The important object of the invention is to provide a device of this character which will hold a bearing absolutely stationary, eliminating any possibility of damage being done to the bearing by slipping of the bearing while it is being treated.

A still further object of the invention is to provide a device of this character which will be adjustable for use in connection with bearings of various sizes.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawing:

Figure 1 is a side elevational view of a supporting device constructed in accordance with the invention, a bearing being shown in dotted lines.

Figure 2 is a plan view of a supporting device.

Figure 3 is a sectional view through the central portion of the device illustrating the manner of supporting the device in a vise.

Referring to the drawing in detail, the support includes spaced rods 5 that extend through openings in the enlarged portions 6 of the supporting posts 7.

These enlarged portions 6 are formed intermediate the ends of the posts 7 and have their ends extended beyond the sides of the posts 7 as clearly shown by Figure 3 of the drawing.

The ends of the posts 7 are reduced as at 8 and 9, the reduced portions 8 being larger than the reduced portions 9, so that the reduced portions may fit into bearing openings of various sized bearings, thereby adapting the tool for use in connection with bearings of various sizes.

In the use of the device, it is contemplated to position the bearing to be scraped or otherwise treated in a manner as shown in dotted lines in Figure 1, whereupon the lower portions of the posts 7 are dropped between the jaws of a vise and securely clamped in position.

Thus it will be seen that the bearing will be firmly held, eliminating any possibility of the bearing moving while it is being scraped or repaired.

Should it be desired to use the support in connection with smaller sized bearings, the tool may be inverted in the vise in such a way as to bring the reduced portions 9 above the vise.

Due to the construction, it will be seen that the post may be adjusted longitudinally of the rod 5 so that the tool may be used in connection with wide or narrow bearings.

The ends of the rods 5 are slightly flared so that the posts 7 will be held on the rods at all times, eliminating the possibility of the posts becoming disconnected when moved longitudinally of the rods 5.

I claim:

1. A support of the class described including a pair of spaced rods, supporting posts having openings through which the rods move, said supporting posts having reduced end portions, said reduced end portions adapted to be fitted in bearing openings to support a bearing, and said posts adapted to be positioned in a vise.

2. A support of the class described including a pair of spaced rods, supporting members adjustably mounted on the rods, said supporting members having reduced end portions to fit in openings of a bearing to support the bearing, and the opposite ends of said supporting members adapted to be clamped within a vise to secure the support.

3. A support of the class described including a pair of spaced rods, supporting posts having enlargement formed with openings to receive the rods to adjustably support the supporting posts with respect to each other, said supporting posts having reduced ends, said reduced ends adapted to be positioned in bearing openings, and said posts adapted to be clamped in a vise.

4. A support of the class described including supporting posts, means for connecting the supporting posts to permit adjustment with respect to each other, and said supporting posts having reduced end portions to fit in bearing openings.

5. A support of the class described including laterally adjustable supporting posts, means for connecting the posts intermediate their ends, the ends of the posts having reduced portions, the reduced portions at the opposite ends of the posts varying in diameter.

6. A support of the class described including laterally adjustable supporting posts, rods on which the posts are mounted, and said posts having reduced end portions to fit into bearing openings to support a bearing.

In testimony that I claim the foregoing as my own, I have hereto affixed my signature.

SIMEON S. BALDWIN.